United States Patent Office 3,073,784
Patented Jan. 15, 1963

3,073,784
ELECTRICALLY CONDUCTIVE POLYMERIC COMPOSITIONS
Andrew Laszlo Endrey, Fairport Harbor, Ohio, assignor to E. I. du Pont de Nemours and Company, Wilmington, Del., a corporation of Delaware
No Drawing. Filed July 2, 1959, Ser. No. 824,461
10 Claims. (Cl. 252—518)

This invention relates to the preparation of shapeable polymeric compositions, polyimide structures containing particles and to a novel process for the production thereof.

Polyimide structures, particularly structures of the polypyromellitimides, are useful and resistant to degradation at high temperature. As a vehicle for metals or metal salts in the preparation of electrically conductive tapes, luminescent tiles, photosensitive materials and decorative films, fibers and the like, the polyimides would seem to be ideal. However, the same outstanding physical and chemical properties that would make these metal or salt-containing polymers extremely useful in the form of shaped structures such as films, filaments, tubing, etc., make it extremely difficult to shape the polymers into useful structures by the ordinary methods of extrusion or injection molding.

The object of the present invention is a process for forming silver-containing polyimide shaped structures. Another object is to form such structures containing silver particles of less than 1 micron. Other objects will appear hereinafter.

The objects are accomplished by first forming a composition containing at least one polyamide-acid having an inherent viscosity of at least 0.1, preferably 0.3–5.0; then reacting the polyamide-acid composition with a silver salt of an oxy acid of carbon to form the silver salt of the polyamide-acid; then shaping the silver salt of the polyamide-acid into a structure; and, thereafter, converting the structure to a polyimide structure containing particles of silver.

The process may be divided into four steps:
(1) Forming the polyamide-acid composition.
(2) Converting the polyamide-acid into its salt.
(3) Shaping the polyamide-acid salt into a useful structure.
(4) Converting the polyamide-acid salt to a metal-containing polyimide.

Each of these steps will be discussed separately in subsequent portions of this specification.

FORMING POLYAMIDE-ACID COMPOSITIONS

The process for preparing the polyamide-acid composition involves reacting at least one organic diamine having the structural formula:

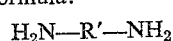

wherein R' is a divalent radical containing at least 2 carbon atoms, the two amino groups of said diamine each attached to separate carbon atoms of said divalent radical; with at least one tetracarboxylic acid dianhydride having the structural formula:

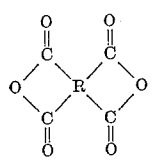

wherein R is a tetravalent radical containing at least 2 carbon atoms, no more than 2 carbonyl groups of said dianhydride attached to any one carbon atom of said tetravalent radical; in an organic polar solvent under anhydrous conditions while maintaining the temperature throughout the reaction below 60° C., preferably below 50° C.

It should be understood that it is not necessary that the polymeric component of the composition be composed entirely of the polyamide-acid. This is particularly true when conversion to the polyimide is contemplated subsequent to shaping the polyamide-acid salt. To retain its shapeability as the salt, the polymeric component of the composition should contain at least 50% of the polyamide-acid; the remainder may be the more difficult to mold conversion product. Thus, while the aforementioned process for preparing the polyamide-acid should be conducted below 50° C. to provide substantially 100% of the polyamide-acid, temperatures up to 60° C. will still provide a composition containing at least 50% of the polyamide-acid in the polymeric component and, in the case of some polyamide-acids, will provide 100% of the polyamide-acid. It is also within the scope of the present invention to convert a portion of the polyamide-acid to the polyimide by heat, treatment with an acetic anhydride-pyridine mixture or treatment with a carbodiimide, e.g., dicyclohexylcarbodiimide. However, the polymeric component of the composition at the end of this step should contain at least 50% of the unconverted polyamide-acid. It should be understood that after the polyamide-acid has been formed, it may be necessary to warm the composition in order to insure substantially complete dissolution of the polyamide-acid in the solvent.

The preferred process involves premixing equimolar amounts of the diamine and the dianhydride as dry solids and then adding the mixture, in small proportions and with agitation, to the organic polar solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature below 60° C. However, the order of addition may be varied within the scope of the present invention. After premixing the diamine and the dianhydride, the solvent may be added to the mixture with agitation. It is also possible to dissolve the diamine in the organic polar solvent while agitating and to add the dianhydride slowly to control the reaction temperature. Ordinarily, in this latter process the last portion of the dianhydride is added with part of the organic polar solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. However, up to 5% excess of either the diamine or the dianhydride may be used in the process. More than 5% excess of either reactant results in an undesirably low molecular weight polyamide-acid. It is desirable to use 1–3% excess of either reactant, preferably the dianhydride, to control the molecular weight of the polyamide-acid. Besides using an excess of one reactant to limit the molecular weight of the polyamide-acid, a chain terminating agent such as phthalic anhydride may be used to "cap" the ends of the polymer chains.

In the preparation of the polyamide-acid compositions, it is essential that the molecular weight be such that the inherent viscosity of the polymer is at least 0.1, preferably 0.3–5.0. The inherent viscosity is measured at 30°

C. at a concentration of 0.5% by weight of the polymer in a suitable solvent. The viscosity of the polymer solution is measured relative to that of the solvent alone and the inherent

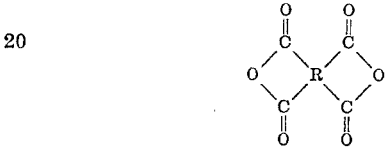

where C is the concentration expressed in grams of polymer per 100 milliliters of solution. As known in the polymer art, inherent viscosity is directly related to the molecular weight of the polymer.

The quantity of organic polar solvent used in preparing the polyamide-acid composition need only be sufficient to dissolve the diamine and to provide, with the ultimate polymeric salt component dissolved therein, a sufficiently low viscosity for forming the composition into shaped articles. It has been found that the most successful results are obtained when the solvent represents at least 85% of both the polyamide-acid solution and final polymeric salt solution. That is, the solution should contain 0.05–15%, preferably 5–10% of the polymeric component.

The starting materials for forming the polyamide-acid composition are organic diamines and tetracarboxylic acid dianhydrides. The organic diamines are characterized by the formula: $H_2N-R'-NH_2$, wherein $R'$, the divalent radical, may be selected from the following groups: aromatic, aliphatic, cycloaliphatic, combination of aromatic and aliphatic, and substituted groups thereof. The most useful diamines are the primary diamines. However, secondary diamines such as piperazine may be used to produce polyamide-acid salt compositions where conversion into the polyimide is not contemplated. The preferred $R'$ groups in the diamines are those containing at least 6 carbon atoms characterized by benzenoid unsaturation. Among the diamines which are suitable for use in the present invention are:

meta-phenylene diamine, para-phenylene diamine;
4,4'-diamino-diphenyl propane;
4,4'-diamine-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
1,5-diamino-naphthalene, 3,3'-dimethyl-4,4'-biphenyl diamine;
3,3'-dimethoxy benzidine;
2,4-bis(beta-amino-t-butyl)toluene;
bis-(para-beta-amino-t-butyl-phenyl)ether;
bis-(para-beta-methyl-delta-amino-pentyl)benzene;
bis-para-(1,1-dimethyl-5-amino-pentyl)benzene;
1-isopropyl-2,4-metaphenylene diamine;
m-xylylene diamine;
6-xylylene diamine;
di(para-amino-cyclohexyl)methane;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4-dimethylheptamethylene diamine;
2,11-diamino-dodecane;
1,2-bis-(3-amino-propoxy ethane);
2,2-dimethyl propylene diamine;
3-methoxy-hexamethylene diamine;
2,5-dimethylhexamethylene diamine;
2,5-dimethylheptamethylene diamine;
3-methylheptamethylene diamine;
5-methyl-nonamethylene diamine;
2,17-diamino-eicosadecane;
1,4-diamino-cyclohexane;
1,10-diamino-1,10-dimethyl decane;
1,12-diamino-octadecane;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;
piperazine;

and mixtures thereof. Particularly desirable mixtures include: 4,4'-diamino-diphenyl methane and para-phenylene diamine; 4,4'-diamino-diphenyl propane and meta-phenylene diamine; and 4,4'-diamino-diphenyl propane and benzidine; benzidine and meta-phenylene diamine; meta-phenylene diamine, para-phenylene diamine and benzidine; meta-phenylene diamine and para-phenylene diamine; 4,4'-diamino-diphenyl ether and benzidine; 4,4'-diamino-diphenyl sulfide and benzidine; and 4,4'-diamino-diphenyl sulfide and 4,4'-diamino-diphenyl ether.

The tetracarboxylic acid dianhydrides are characterized by the following formula:

$$\begin{array}{c} O \quad\quad O \\ \| \quad\quad \| \\ C \quad\quad C \\ O / \ \backslash R / \ \backslash O \\ \backslash C \ / \ \backslash C / \\ \| \quad\quad \| \\ O \quad\quad O \end{array}$$

wherein R is a tetravalent radical selected from the group consisting of aromatic, aliphatic, cycloaliphatic, combination of aromatic and aliphatic, and substituted groups thereof. However, the preferred dianhydrides are those in which the R groups have at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

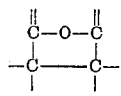

Illustrations of dianhydrides suitable for use in the present invention include: pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, 3,4-dicarboxyphenyl sulfone dianhydride, perylene 3,4,9,10-tetracarboxylic acid dianhydride, bis(3,4-dicarboxyphenyl) ether dianhydride, etc.

The solvents useful in the solution polymerization process for synthesizing the polyamide-acid compositions are the organic polar solvents having a dipole moment whose functional groups do not react with the diamines or the dianhydrides. Besides being inert to the system and being a solvent for the product, the organic polar solvent must be a solvent for at least one of the reactants, preferably for both of the reactants. The normally liquid organic polar solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid salts and/or the shaped articles of the polyamide-acid salts by evaporation, displacement or diffusion. Other typical compounds of this useful class of solvents are: N,N-diethylformamide, N,N-diethylacetamide, N,N-dimethylmethoxy acetamide, etc. Other organic polar solvents which may be used in the present invention are: dimethylsulfoxide, diethylsulfoxide, N-methyl-2-pyrrolidone, pyridine, dimethylsulfone, diethylsulfone, dipropylsulfone, hexamethylphosphoramide, tetramethylene sulfone, dimethyltetramethylene sulfone, dimethoxytetramethylene sulfone. The solvents can be used alone, in combinations of solvents, or in combinations with nonsolvents such as benzene, benzonitrile, dioxane, butyrolactone, xylene, toluene and cyclohexane. However, the addition of water cannot be tolerated. It is necessary that the process be conducted in an essentially anhydrous condition.

CONVERTING INTO POLYAMIDE-ACID SALT AND SHAPING THE SALT

The conversion of the polyamide-acid, which comprises at least 50% of the polymeric component of the composition produced in the first step, is accomplished by adding a solution in an organic polar solvent of a silver salt of an oxy acid of carbon. The metathetical reaction is permitted to take place while maintaining the temperature within a range of 0°–50° C. The silver salts are those having as their negative ion, ions derived from monocarboxylic or polycarboxylic acids such as a fatty acid (e.g., formic, acetic or propionic acid), a dicarboxylic aliphatic acid (e.g., oxalic or succinic acid), an unsaturated acid (e.g., maleic or fumaric acid), and ether acid (e.g., diglycolic or dilactic acid), a hydroxy acid (e.g., tartaric or citric acid) or an aromatic acid (e.g., benzoic or phthalic acid), or the ion derived from carbonic acid.

It should be understood that when it is desired to use the polyamide-acid compositions as such as a coating or an impregnant, i.e., without converting to the polyimide plus the free metal, then other group I[1] metals such as sodium, lithium or potassium as well as silver may be used. However, because of their reactivity, sodium, lithium and potassium are not very useful as free metal particles in any ultimate polyimide structure.

The metal salt is preferably added as part of a solution in an organic solvent. The organic solvent is preferably the same as that used previously in the preparation of the polyamide-acid but may be any of those listed previously, which solvent is a solvent for the particular metal salt under consideration. If sufficient solvent were used in forming the polyamide-acid composition, then the metal salt in solid form may be added in this step.

In the formation of the metal salt of the polyamide-acid, rapid stirring and the addition of more solvent or pyridine or a beta-ketonic type compound such as ethyl acetoacetate are advised to clear any gel or insoluble matter that may form in the polyamide-acid salt solution. The viscous salt solution, which should contain preferably at least 85% solvent as discussed previously, is then formed into a useful shaped structure by molding, casting or extrusion. The viscosity of the salt composition for shaping should be sufficiently low for forming the composition into shaped articles. The viscosity can be controlled by the addition of solvent to or removal of it from the viscous dope. The shaped structure is then dried by exposure to air at the boiling temperature of the solvent for a short period.

The degree of substitution of metal for hydrogen achieved in this step depends upon the amount of metal salt added and the temperature and time permitted for the reaction. In the discussion that follows, a substitution of 1 mole of metal per polymer unit will be illustrated, i.e., 0.5 mole of metal per carboxyl unit of polyamide-acid. For the purpose of the present invention, a substitution of 0.1 mole–2 moles of metal per polymer unit can be used successfully. Thus, the shapeable polymeric composition at this stage may be described as one comprising 0.05–15% by weight of at least one polyamide-acid salt having the recurring unit:

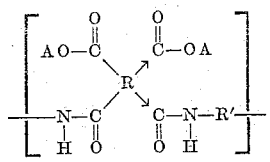

wherein → denotes isomerism; wherein R is a tetravalent radical containing at least six carbon atoms character-

[1] Group I of Mendeleef's Periodic Table of the Elements, Handbook of Chemistry and Physics (25th ed.), published by Chemical Rubber Publishing Co.

ized by benzenoid unsaturation, the four carbonyl groups of each polyamide-acid unit being attached to separate carbon atoms and each pair of carbonyl groups being directly attached to adjacent carbon atoms in said tetravalent radical; wherein R' is a divalent radical containing at least 2 carbon atoms, the amide groups of adjacent polyamide-acid units each attached to separate carbon atoms of said divalent radical; and wherein A is selected from the group consisting of hydrogen and a Group I metal, the minimum substitution of metal per polymer unit being 0.1 mole.

dissolved in 85–99.95% of an organic polar solvent; said polyamide-acid salt having an inherent viscosity of at least 0.1.

CONVERTING INTO POLYIMIDE

The shaped articles composed of at least 50% of a metal salt of a polyamide-acid may then be converted to the respective polyimide shaped articles. One process involves converting the polyamide-acid salts having the recurring units of the following structural formula:

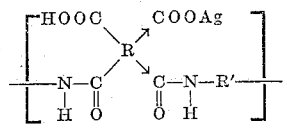

wherein → denotes isomerism to polyimides plus free metal by heating above 50° C. Heating serves to convert pairs of amide and metal-substituted carboxylic acid groups to imide groups plus free metal particles. Heating may be conducted for a period of a few seconds to several hours. It is preferred to have gradual temperature increases up to and within the conversion range in order to discourage the tendency of void and bubble formation within the polyimides as a result of the water vapor given off and to avoid crystallization or embrittlement. It has also been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the metal-containing polyimide structure are obtained.

Other processes for conversion may involve treatment with one or more chemicals which serve to dehydrate the polyamide-acid salt to form the polyimide plus metal and which also act as effective cyclizing agents.

The presence of polyimides is evidenced by their insolubility in cold basic reagents as opposed to the rapid solubility of the polyamide-acid. Their presence is also apparent if the polyamide-acid salts are scanned with infrared during conversion to the polyimide. The spectra initially show a predominating absorption band at ca. 3.1 microns due to the NH bond. This band gradually disappears, and as the reaction progresses, the polyimide absorption band, a doubleton, appears at ca. 5.64 and 5.89 microns. When conversion is completed the characteristic polyimide band predominates.

It is surprising to note that the final polyimide structures containing silver particles may be transparent and may not show diffraction by the incorporated particles nor may the particles be visible under an ordinary microscope. This means that the particles therein have dimensions smaller than the wave length of light, i.e., the particles do not have dimensions greater than 0.8 micron. In any event, the process of the present invention makes it possible to provide polyimide structures containing metal particles up to about 1 micron. Any process which would attempt to incorporate finely-divided or powdered metal particles in a final structure, if such could be accomplished with polyimide structures, would provide structures containing particles larger than 1 micron.

The invention will be more clearly understood by referring to the examples which follow, Example 1 representing the best mode contemplated for practicing the present invention. The examples are all directed to the formation of silver-containing polyimide films for use as decorative or electrically conductive tapes, packaging materials, etc. However, decorative or transparent electrically conductive filaments or a variety of novel molded products can also be prepared by the present invention.

*Example 1*

4,4'-diamino-diphenyl methane, 11.6 grams (0.058 mole) was dissolved in 150 milliliters of dimethylformamide. To this solution, 12.7 grams (0.058 mole) of pyromellitic dianhydride was added portionwise with agitation while the solution was externally cooled with circulating water at approximately 15° C. A viscous dope formed which was further diluted with 30 milliliters of dimethylformamide to give a solution containing 12% by weight of the polyamide-acid. The inherent viscosity was 2 (0.5% solution in dimethylformamide).

A 10% solution of silver acetate in pyridine, 10.0 grams (0.0058 mole of silver) was added with stirring to 20.0 grams of the 12% dimethylformamide solution of the polyamide-acid (0.0058 mole of polymer unit). After a slight initial precipitation, rapid stirring and the addition of a slight amount of pyridine yielded a clear viscous dope.

A film was cast onto a glass plate with a doctor knife having a 15-mil opening. The film was dried at 130° C. for 15 minutes in air in a forced draft oven. The film was stripped from the glass plate and residual solvent was removed. The film, which was the silver salt of the polyamide-acid, was clear, tough and flexible. The film contained 16.4% silver, approximately 0.5 mole per carboxyl unit.

The polyamide-acid salt film was then heated in a vacuum oven under a nitrogen atmosphere at a temperature of 300° C. for 30 minutes. A tough, flexible, opaque film with a metallic luster was obtained. This film was shown to be a polyimide film containing silver particles having their greatest dimension of about 0.8 micron by the following tests.

By ordinary chemical analysis, the film was found to contain 21.8% silver as compared to 22.0% calculated on the basis of one atom of silver for each polymer unit (for each two imide groups). X-ray analysis showed strong lines for free metallic silver at 2.36 angstrom units, 2.04 angstrom units and 1.23 angstrom units. Strong infrared absorption was obtained by conventional techniques at 5.62 microns and 5.80 microns, characteristic of the carbonyl groups in polyimides. The disappearance of absorption was observed at 3.0 microns, 6.2–6.4 microns and 3.5–4.5 microns, the first two being characteristic of the amide groups and the latter being characteristic of the carboxyl groups, both groups of the polyamide-acid precursor. At this stage, the silver-containing polyimide film was not electrically conducting. Further heat treatment of the film for 5–7 hours at 275° C. in air converted it to an electrically conducting film.

*Example 2*

A polyamide-acid silver salt film containing 0.75 mole of silver per carboxyl unit was prepared as in Example 1 using 7.4 grams of the 10% silver acetate solution in pyridine.

The salt was converted to a polyimide film containing silver particles by heating in air at a temperature of 300° C. for about 3 hours. The resulting product was electrically conducting.

When heated to 350° C. for 20 minutes, the polyamide-acid salt film was converted to a polyimide film having metallic surfaces. The product conducted electricity on both surfaces.

*Example 3*

A dope was prepared from 12.4 grams of metaphenylene diamine, 21.1 grams of pyromellitic anhydride, 6.6 grams of acetic anhydride, 13.2 milliliters of pyridine and 99 milliliters of dimethylformamide. Analysis showed that approximately 30% of the polyamide-acid contained in this dope had been converted to the corresponding polyimide. Ten grams of this dope was reacted with 3.7 grams of silver acetate with good stirring. The solution became very viscous and an additional 5 milliliters of pyridine was added. The resulting fluid dope was cast at a 10 mil doctor knife opening, dried at 120° C. for 10 minutes to give clear, flexible, silver-containing films. This film was heated under vacuum in a nitrogen atmosphere at 300° C. for 30 minutes, followed by heating at 380° C. for 30 seconds to relax the film. A very dark, metallic-appearing, flexible, tough film was obtained. The film contained 16.1% of silver, compared with a value of 15.7% calculated for one-half mole of silver for each carboxyl group of the polyamide-acid.

*Example 4*

A polyamide-acid from 4,4'-diamino-diphenylmethane and pyromellitic dianhydride was prepared as described in Example 1.

Fifteen grams of a 10% solution of silver caprylate in pyridine (0.0058 mole of silver) was added with stirring to 20.0 grams of the 12% dimethylformamide solution of the polyamide-acid (0.0058 mole of the polymer unit). This solution was cast into a film, the film was dried and then converted in the silver-containing polyimide film as described in Example 1. The resulting film that was obtained was similar to that described in Example 1.

*Example 5*

4,4'-diamino-diphenyl methane, 10.0 grams was dissolved in 40 milliliters of dimethylformamide. To this solution, 11.0 grams of pyromellitic dianhydride was added portionwise with agitation while the solution was externally cooled with circulating water at approximately 15° C. A viscous dope formed which was further diluted with 60 milliliters of dimethylformamide.

Lithium acetate, 5.15 grams, was added with stirring and the solution was diluted further with 55 milliliters of dimethylformamide and 25 milliliters of glacial acetic acid.

A film was cast onto a glass plate and dried in vacuo at 60° C. for 24 hours. The film was stripped from the glass plate and residual solvent was removed. The dry film, which was the lithium salt of the polyamide-acid, was moderately tough and flexible.

What is claimed is:

1. A shapeable polymeric composition consisting essentially of 0.05–15% by weight of at least one polyamide-acid salt having the recurring unit:

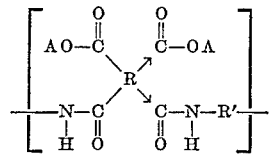

wherein → denotes isomerism; wherein R is a tetravalent radical containing at least six carbon atoms characterized by benzenoid unsaturation, the four carbonyl groups of each polyamide-acid unit being attached to separate carbon atoms and each pair of carbonyl groups being directly attached to adjacent carbon atoms in said tetravalent radical; wherein R' is a divalent radical containing at least 2 carbon atoms, the amide groups of adjacent polyamide-acid units each attached to separate carbon atoms of said divalent radical; and wherein A is selected from the group consisting of hydrogen and a group I metal, the minimum substitution of metal per polymer unit being 0.1 mole, dissolved in at least 85% by weight of an organic polar solvent inert to the system and being a solvent for at least one of the reactants; said polamide-acid salt having an inherent viscosity of at least 0.1.

2. A shapeable polymeric composition as in claim 1 wherein R is derived from pyromellitic dianhydride.

3. A shapeable polymeric composition as in claim 1 wherein R' is derived from 4,4'-diamino diphenyl methane.

4. A shapeable polymeric composition as in claim 1 wherein the group I metal is silver.

5. A shapeable polymeric composition consisting essentially of 0.05-15% by weight of at least one polyamide-acid salt having the recurring unit:

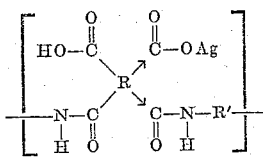

wherein → denotes isomerism; wherein R is a tetravalent radical containing at least six carbon atoms characterized by benzenoid unsaturation, the four carbonyl groups of each polyamide-acid unit being attached to separate carbon atoms and each pair of carbonyl groups being directly attached to adjacent carbon atoms in said tetravalent radical; wherein R' is a divalent radical containing at least 2 carbon atoms, the amide groups of adjacent polyamide-acid units each attached to separate carbon atoms of said divalent radical; and wherein Ag is silver, dissolved in at least 85% of an organic polar solvent, said solvent being inert to the system and being a solvent for at least one of the reactants; said polyamide-acid salt having an inherent viscosity of at least 0.1.

6. A process which comprises reacting at least one diamine having the structural formula:

$$H_2N\text{---}R'\text{---}NH_2$$

wherein R' is a divalent radical containing at least two carbon atoms, with at least one tetracarboxylic acid dianhydride having the structural formula:

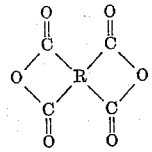

wherein R is a tetravalent radical containing at least six carbon atoms characterized by benzenoid unsaturation, the four carbonyl groups being attached to separate carbon atoms and each pair of carbonyl groups being attached to adjacent carbon atoms in the R radical, in an organic polar solvent, said solvent being inert to the system and being a solvent for at least one of the reactants under substantially anhydrous conditions while maintaining the temperature throughout the reaction below 60° C. to form a polymeric composition containing at least 50% polyamide-acid having the recurring unit

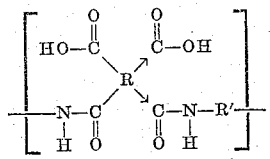

wherein → denotes isomerism and wherein R and R' are as aforesaid; reacting said polymeric composition with a silver salt of an oxy acid of carbon, to form a polyamide-acid salt composition containing a minimum of 0.1 mole silver per polymer unit; forming said polyamide-acid salt composition into a shaped structure; and heating said structure at a temperature above 50° C. to convert said polyamide-acid salt structure to a polyamide structure containing silver particles.

7. A process as in claim 6 wherein the structure is heated further to a temperature of 300° C.–500° C. for at least 15 seconds.

8. A process as in claim 6 wherein said diamine is 4,4'-diamino diphenyl methane.

9. A process as in claim 6 wherein said dianhydride is pyromellitic dianhydride.

10. A process as in claim 6 wherein said metal salt is silver acetate.

References Cited in the file of this patent

UNITED STATES PATENTS

| | | |
|---|---|---|
| 2,710,853 | Edwards et al. | June 14, 1955 |
| 2,712,543 | Gresham et al. | July 5, 1955 |
| 2,731,447 | Gresham et al. | Jan. 17, 1956 |
| 2,795,680 | Peck | June 11, 1957 |
| 2,864,774 | Robinson | Dec. 16, 1958 |
| 2,867,609 | Edwards et al. | Jan. 6, 1959 |
| 2,880,181 | Williams | Mar. 31, 1959 |
| 2,880,230 | Edwards et al. | Mar. 31, 1959 |

FOREIGN PATENTS

| | | |
|---|---|---|
| 570,858 | Great Britain | July 25, 1945 |

UNITED STATES PATENT OFFICE
CERTIFICATE OF CORRECTION

Patent No. 3,073,784 January 15, 1963

Andrew Laszlo Endrey

It is hereby certified that error appears in the above numbered patent requiring correction and that the said Letters Patent should read as corrected below.

Column 10, line 27, for "a polyamide" read -- a polyimide --.

Signed and sealed this 27th day of August 1963.

(SEAL)
Attest:

ERNEST W. SWIDER
Attesting Officer

DAVID L. LADD
Commissioner of Patents